COMBINED READ-WRITE AND ERASE HEAD ASSEMBLY

Filed April 11, 1960 2 Sheets-Sheet 1

INVENTOR.
KYRIACOS JOANNOU

BY Fred Jacob

ATTORNEY

INVENTOR.
KYRIACOS JOANNOU
BY Fred Jacob
ATTORNEY

United States Patent Office 3,105,965
Patented Oct. 1, 1963

3,105,965

COMBINED READ-WRITE AND ERASE HEAD ASSEMBLY

Kyriacos Joannou, Cambridge, Mass., assignor to Minneapolis-Honeywell Regulator Company, Minneapolis, Minn., a corporation of Delaware Filed Apr. 11, 1960, Ser. No. 21,279
2 Claims. (Cl. 340—174.1)

The present invention relates in general to new and improved magnetic head assemblies, in particular to magnetic head assemblies for transferring data to and from a magnetic data storage medium at frequencies within a predetermined frequency band and for erasing at wall data recorded in the storage medium.

In many recording applications it is important to store data in the magnetic storage medium at relatively high densities. For example, in present day digital data processing systems, storage densities upward of six hundred bits per linear inch of the storage medium are common. Since any overlap of the successive "bit" areas in the medium results in a deterioration of the data read-in and read-out performance, it becomes important to provide a flux probe of very high resolution which is capable of saturating a small and sharply limited area of the storage medium.

In general, a high flux resolution requires a high concentration of flux, i.e. a high flux density in a sharply defined volume. The construction of the core and its flux gap must cause the flux lines to be pushed outwardly in order to link with the adjacent storage medium. Heretofore, magnetic recording heads which employed a single flux gap, have not been able to provide a flux resolution sufficiently high to satisfy exacting high-density storage requirements.

Prior attempts at overcoming this deficiency have frequently resulted in elaborate magnetic heads which are expensive to build and difficult to maintain. In one such scheme for obtaining a high-resolution flux probe, a pair of small magnetic fields of a polarity opposite to that in the flux gap are provided on both sides of the latter. The spreading side portions of the magnetic flux which appear across the poles of the core are thereby neutralized so that a sharp flux probe results.

A magnetic head of this type, although it meets the requirements of a high-resolution flux probe, adds materially to the expense of the magnetic head assembly, both in initial construction and in maintenance. It further raises problems of proper timing since the three magnetic fields associated with each magnetic head must be provided simultaneously. Additionally, an assembly which uses magnetic heads of this type requires more power and thus reduces the over-all efficiency of the recording operation.

Heretofore, if the foregoing disadvantages of the high-resolution probe described above precluded its use for high density recording, a certain amount of overlap of the successive bit areas had to be accepted. Where this condition prevails, the reliability of data read-out is frequently marginal even where special read-out techniques are employed.

In order to obtain optimum operating conditions, the magnetic cores of the magnetic head must have good efficiency, i.e., they must be capable of being energized with a relatively small current to provide the required flux density in the gap sufficient to saturate the storage medium. In carrying out this objective, it is desirable to maintain the size of the magnetic core as small as possible in order to keep the inductive core impedance to a minimum. A small inductive core impedance not only improves materially the efficiency of the core, but also facilitates the impedance match of the core winding with any associated circuitry. This is particularly important where transistor circuits are coupled to the core winding.

Present-day data processing systems require not only the ability to store the data at very high densities, but also to read the data in and out of storage rapidly, i.e., the ability to operate at high data transfer frequencies. If, as is frequently the case, the transfer of data occurs only at frequencies which lie in a predetermined frequency band, a considerable improvement in the signal-to-noise ratio can be effected by attenuating those signals which occur at frequencies beyond the desired band limits.

Heretofore it was necessary to employ band pass filters in order to provide such frequency discrimination, or to use a flux gap of varying length. The use of special filters not only adds to the expense of the equipment, but also causes some attenuation of the desired signal. The use of a core which has a flux gap of varying length similarly adds to the cost of the equipment and is further unsatisfactory because it is inherently incapable of providing optimum operating conditions particularly where the desired frequency band is broad. This is due to the fact that each frequency requires a different core bias in order to obtain an optimum signal-to-noise ratio. Since the applied bias for such a core is normally chosen at the median frequency of the desired frequency band, poor performance is encountered particularly at the high frequency end of the band. Additionally such a core configuration serves to lower the operating efficiency and to reduce the flux which is available for recording purposes.

A further problem which is generally encountered in multi-core magnetic head assemblies, is cross-talk between the respective data tracks which are associated with the cores. This problem becomes acute in high-density data storage systems where the tracks are closely spaced in order to conserve space on the storage medium. It is caused by the spreading of the flux after it leaves the core gap, as well as by the small amount of relative transverse motion which inevitably exists between the magnetic head and the data storage medium. Although, in the past, many attempts have been made at solving this problem, including the staggering of adjacent flux gaps to reduce the flux linkage between adjacent cores, the resultant head assemblies have not been completely satisfactory in operation. Not only is cross-talk still present to an appreciable extent in the staggered gap construction, but additional problems, such as the proper synchronization of the staggered cores, must be considered.

It is the primary object of this invention to provide a magnetic head assembly which is free from the above-discussed disadvantages.

It is another object of this invention to provide an improved magnetic head assembly which is simple in construction and economical to manufacture.

It is a further object of this invention to provide a magnetic head assembly in which cross-talk between the respective channels is minimized.

It is an additional object of this invention to provide a magnetic head assembly in which a flux probe of high density and high resolution is obtained.

It is still another object of this invention to provide a magnetic core for a magnetic head assembly which has a small inductance and which is adapted to improve the efficiency of read-in and read-out.

It is a further object of this invention to provide a frequency-sensitive magnetic core for use in a magnetic head assembly which is adapted to transfer data at frequencies within a predetermined frequency band.

It is yet another object of this invention to provide a magnetic head assembly which has a plurality of magnetic cores each adapted to transfer data in a different frequency range.

The present invention which overcomes the above-discussed disadvantages of prior art magnetic head assemblies, consists of an assembly wherein a plurality of magnetic read-write cores are positioned parallel to each other with their gaps aligned along the transverse assembly dimension. Successively positioned cores are separated from each other by shielding foils which overlap the core dimensions.

Each core has a pole section with substantially parallel exterior and interior surfaces. These surfaces are divided by the aforesaid flux gap which is substantially normal thereto. The exterior surfaces of the pole sections of the respective cores, as well as one edge surface of each of the aforementioned shielding foils, lie in a common surface which is adapted to be presented to a storage medium for data transfer therebetween.

Each of the magnetic read-write cores is frequency-sensitive by virtue of a predetermined relationship of the length of its exterior pole section surface to the length of its gap. The ratio of these dimensions determines the upper and lower limits of the frequency band in which a data transfer can be effected without substantial attenuation. A pair of core legs which diverge initially from opposite ends of the aforementioned pole section, is connected at the other ends by a core base.

The configuration of the core is such that its cross-sectional area increases progressively between the gap and the base. The minimum spacing of the interior surfaces of the diverging leg portions of each core is determined by the length of the interior pole section surface and is chosen to minimize the flux linkage between the core legs. The exterior surfaces of the aforementioned core leg portions intersect the exterior pole face surface at an angle which is chosen to provide a predetermined rate of decrease of the flux linkage with the storage medium at frequencies below the lower limit of the chosen frequency band.

An erasing core, which is substantially identical in cross-section to the aforementioned read-write cores, has a transverse dimension sufficient to cover all the data tracks on the storage medium. The gap of the erasing core is spaced from the gaps of the read-write cores in the direction of the relative read-write motion of the magnetic head and the storage medium and is located in the aforementioned common presenting surface. The frequency-sensitive property of the magnetic head assembly thus permits its effective operation in the selected frequency band and makes possible the choice of design parameters which are adapted to provide the optimum signal-to-noise ratio.

The various novel features which characterize the invention are pointed out with particularity in the claims annexed to and forming a part of this specification. For a better understanding of the invention, its advantages and specific objects thereof, reference should be had to the following detailed description and the accompanying drawings in which:

Figure 1:
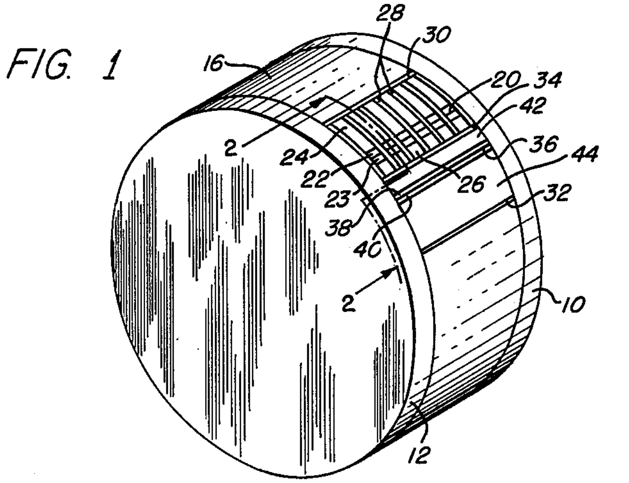
FIGURE 1 illustrates a preferred embodiment of the improved magnetic head assembly.

With reference now to the drawings, FIGURE 1 illustrates a preferred embodiment of the magnetic head assembly which forms the subject matter of the invention herein. It will be understood that the relative dimensions shown in FIGURE 1, and in the subsequent figures, are not necessarily representative of the actual dimensions since the latter are too small in certain instances to be depicted accurately. The assembly is seen to be cylindrical in form, the top and bottom portions of the cylinder being defined by a pair of circular retaining plates 10 and 12. The cylinder wall includes a curved surface 16, a portion of which is adapted to be presented to a magnetic data storage medium.

A plurality of magnetic read-write cores 18 are positioned parallel to each other with their flux gaps 20 aligned along the transverse dimension of the assembly. In FIGURE 1, only the exterior surfaces 22 and 23 of the pole section of the magnetic cores are visible and are seen to conform to the contour of the presenting surface 16.

Figure 2:
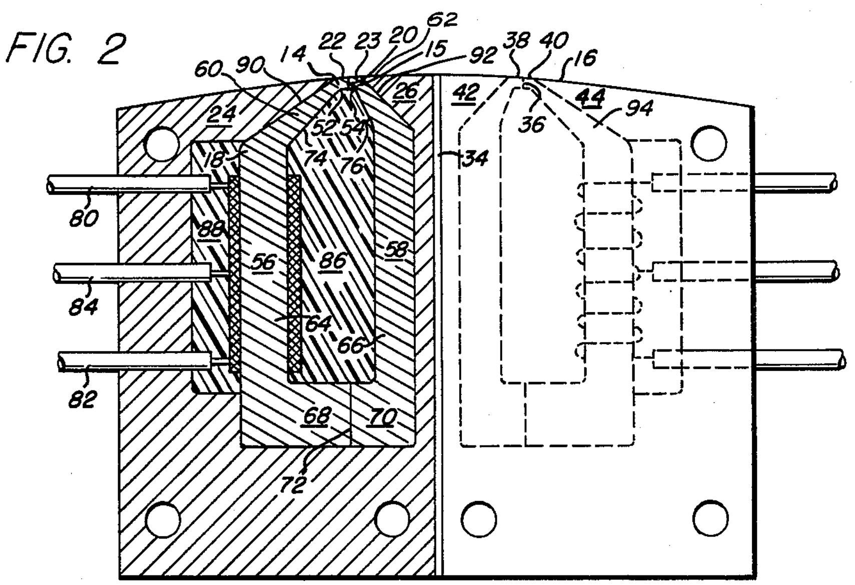
FIGURE 2 is a cross-sectional view taken along line 2—2 of FIGURE 1.
Figure 3:
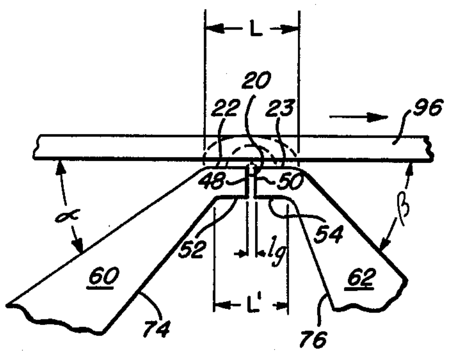
FIGURE 3 illustrates the data read-in operation.
Figure 4:
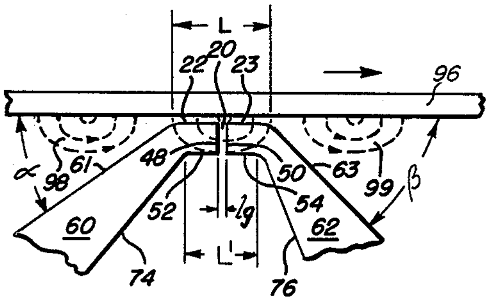
FIGURE 4 illustrates the data read-out operation.

As will appear more clearly from FIGURES 2 to 4 of the drawings, each read-write core has a pair of surfaces 90 and 92 which slope away from the presenting surface on either side of the surfaces 22 and 23. The angular spaces, which are thus defined by the sloping core legs and by the surface 16, are labelled 24 and 26 respectively in FIGURE 2. Each of the spaces contains a non-magnetic metal, e.g., p-metal alloy which has a very high resistivity and whose upper surface conforms to the presenting surface 16. This alloy, which may have a composition of 75% Mn and 25% Cu, moreover presents a surface of very low friction to the magnetic tape. Furthermore, each of the flux gaps 20 contains a non-magnetic metallic spacer which may also consist of p-metal alloy and whose exposed edge surface conforms with the presenting surface 16.

The successively positioned read-write cores are interleaved with shielding foils 28, each preferably consisting of a foil of u-metal alloy disposed between two copper foils and extending beyond the cores themselves. The latter alloy is characterized by its high permeability and may have a composition as follows: 78.8% Ni, 14.9% Fe, 4.8% Cu, and 1.5% Cr. Each shielding foil 28 further has an upper edge surface which conforms with the presenting surface 16. A pair of transverse shielding foils 30 and 32 respectively separate the magnetic head from the remainder of the assembly, and a transverse shieliding foil 34 separates the read-write portion of the magnetic head assembly from the erasing portion.

As may be seen from FIGURE 2, the cross-sectional configuration of the erasing core 94 is similar to that of the read-write cores 18. Unlike the read-write cores, however, whose thickness is small, the erasing core extends substantially throughout the entire transverse dimension of the assembly and its gap 36 covers the data tracks which correspond to all the read-write cores. Only the exterior surfaces 38 and 40 of the erasing core pole section, which conform to the surface 16, are visible in FIGURE 1. The spaces 42 and 44 which are defined by the sloping leg surfaces of the erasing core and by the presenting surface 16, contain a non-magnetic metal such as the above-mentioned p-metal alloy which conforms to the common presenting surface 16. Similarly, the flux gap of the erasing core contains a non-magnetic metal spacer which may also consist of p-metal alloy and whose upper edge conforms to the presenting surface.

FIGURES 2 to 4 illustrate the magnetic head assembly in greater detail, applicable reference numerals having been retained. As previously explained, it is generally desirable that the magnetic cores be as small as possible. A core of small size not only conserves space and permits more cores to be positioned in a single magnetic head assembly, but it also has low inductance. A small inductive impedance enhances the ability of the core to be driven by a small current and thus contributes to a greater efficiency of operation. Additionally, since the presence of inductance serves to lengthen the rise time of the leading edge of the applied current pulses, it is advantageous to have a core whose inductance is small in order to minimize the amount of delay which is introduced. This becomes particularly important where the circuits which are coupled to the core are transistor circuits.

The pole section of each magnetic core consists of a pair of pole pieces 14 and 15 which are defined by the exterior surfaces 22 and 23, a pair of mutually confronting pole faces 48 and 50 and by a pair of interior surfaces 52 and 54. The pole faces are perpendicular to the interior and exterior surfaces which are substantially parallel to each other. As will appear more clearly from FIGURES 3 and 4, the surfaces 22 and 23 jointly form the exterior surface of the core pole section which has a length L and which conforms to the aforementioned presenting surface 16. Similarly, the surfaces 52 and 54 jointly form the interior surface of the pole section which has a length equal to L′. The spacing of the pole faces 48 and 50 determines the length $l_g$ of the gap 20.

The read-write core further includes a pair of core legs 56 and 58 consisting of a pair of first leg portions 60 and 62 and a pair of second leg portions 64 and 66 respectively. The core leg portions 60 and 62 are seen to diverge from opposite ends of the core pole section until they join the parallel leg portions 64 and 66. The diverging leg portions 60 and 62 are seen to have a uniformly increasing cross-section while the cross-section of the leg portions 64 and 66 is constant throughout. The opposite ends of the last-recited leg portions terminate in a pair of base portions 68 and 70 which are substantially normal to the second leg portions 64 and 66. The respective base portions include a pair of abutting surfaces 72 which abut each other to provide a continuous flux path. The base portions 68 and 70 jointly constitute the core base which has a substantially uniform cross-section and whose exterior and interior surfaces are substantially parallel to the corresponding surfaces of the core pole section.

It will be noted, that the cross-section of the core increases progressively from the gap 20 to the base and that no decrease of the cross-section is encountered in the transitional areas between the pole pieces 14 and 15 and the leg portions 60 and 62 respectively, between the respective leg portions, and between the leg portions 64 and 66 and the base portions 68 and 70 respectively. This construction effects a concentration of the flux in order to obtain a high flux density. It will be further noted that the corners of the core are rounded off in the vicinity of the aforementioned transitional areas in order to minimize flux leakage from these areas.

The leg portions 60 and 62 have a pair of interior surfaces 74 and 76 which diverge outwardly from the interior pole section surface 52—54. The length L′ of the surface 52—54 thus defines the minimum spacing of the surfaces 74 and 76. This length is chosen in order to minimize flux leakage between the surfaces 74 and 76. In addition, the surfaces 52 and 54 are co-planar so that the reluctance of the flux path between those surfaces is high. The effect of this construction is to reduce the flux leakage and to concentrate the flux in the gap so as to obtain a very high flux density. Under optimum conditions L′ equals L and no flux linkage occurs between the leg portions 60 and 62 at any frequency below $f_{min}$. It must be remembered, however, that the cross-sectional area of the transitional core region between the leg portions 60 and 62 and the pole pieces may not be smaller than the cross-sectional area of the pole pieces themselves if maximum flux density is to be obtained in the gap.

In the absence of a non-magnetic spacer in the flux gap, the flux bridges the gap directly between the mutually confronting pole faces. If a spacer is present, the flux is forced outwardly and follows the path of least reluctance. Flux bridging across the interior pole piece surfaces 52 and 54 is largely precluded due to the relatively long flux path (and hence the high reluctance) between these surfaces. Flux bridging across the exterior pole piece surfaces 22 and 23 is facilitated by the proximity of the magnetic storage medium. Accordingly, a bridging flux of high density is provided exteriorly of the gap between the surfaces 22 and 23, high flux resolution being obtained if the latter surfaces are small.

The core leg 56 carries a core winding 78 which is connected between the terminals 80 and 82. A third terminal 84 is connected as a center tap of the core winding. The interior space 86 of the core, as well as the space 88 through which the core winding terminals extend, are filled with a potting compound in order to lend rigidity to the assembly structure. A non-magnetic metal, e.g., p-metal alloy, surrounds the core and, as previously explained, extends into the angular spaces 24 and 26 which are defined by the presenting surface 16 and by the exterior surfaces 90 and 92 of the diverging core leg portions 60 and 62.

It will be noted from FIGURE 2 that the construction of each of the read-write cores, as well as of the erasing cores, is asymmetrical, i.e. the common plane normal to the paper which contains the gap 20 and the abutting surfaces 72, is closer to the exterior surface of the leg portions 66 than to the corresponding surface of the leg portion 64. Similarly, the erasing gap 36 of the erasing core 94 is asymmetrically disposed, the read-write cores and the erasing core being positioned in mirror-image relationship with respect to the shielding foil 34. This construction permits a closer spacing of the gaps 20 and 36 than would otherwise be possible and hence rapid erasing of the recorded data without an undue time lag may be effected.

For the sake of clarity, the magnetic storage medium 96 which may consist of magnetic tape, is shown to be spaced from the exterior pole section surface 22—23 in FIGURES 3 and 4. Although a temporary separation of the tape from the surface 22—23 is possible when dust particles or the like enter between these surfaces, the maximum storage density will be obtained when the tape is in contact with the presenting surface 16 in the vicinity of the flux gaps. The reason for this behavior is due to the fact that flux fringing occurs once the flux leaves the vicinity of the gap. Accordingly, any appreciable separation of the tape from the surface 22—23 results in spreading of the flux probe and hence in a loss of resolution.

The minimum gap length $l_g$ determines the upper frequency of the data which can be read into or out of the storage medium. In general, it can be stated that $$\frac{\lambda_{f\,max.}}{2}=l_g$$

where $f$ max.=maximum band frequency
$\lambda$=wave length
$l_g$=gap length

It is usually desirable to make the length of the flux gap as small as possible in order to permit the core to operate at very high frequencies. However, if the flux gap is excessively small, its length approaches the dimensions of dust particles or the like which are apt to produce a temporary separation of the magnetic tape from the surface 22—23. When this occurs, the reluctance of the flux gap becomes comparable in magnitude to the reluctance across the aforementioned separation and data may be lost in the transfer between the core and the storage medium under these conditions.

Having set the upper frequency limit of the desired frequency band by choosing the proper gap length, the lower frequency limit which is determined by noise considerations may be set by the proper choice of the length L of the surface 22—23. As will be seen from a consideration of FIGURE 3, if the wave length of the data signal exceeds the dimension L, the flux path includes the air gaps of the angles $\alpha$ and $\beta$ respectively. Under these conditions, a rapid attenuation of the data signal occurs in accordance with the equation:

$$\text{Signal loss in db}=55\frac{\delta}{\lambda}$$

where $\lambda$=wave length $\delta$=reluctance of flux path between storage medium and the surface 61 (or 63) at a point determined by $\lambda$.

Thus, the length L of the surface 22—23 effectively determines the lower band frequency according to the equation $$\frac{\lambda_{f\ min.}}{2}=L$$

where $f$ min.=minimum band frequency $\lambda$=wave length

As a general rule, it is desirable to keep the length L of the exterior pole section surfaces 22—23 as small as possible to improve the resolution of the flux probe and to avoid any unnecessary flux linkage with the magnetic tape 96. For example, from a consideration of FIGURE 4 it will be clear that any increase in the length of either surface 22 or 23 will cause it to link with the flux lines 98 or 99 respectively of the data bits which are stored on either side of the bit that is being read out. The contributions of the flux lines 98 and 99 respectively will then appear as noise in the output signal of the bit which is being read out, thereby reducing the over-all signal-to-noise ratio.

Moreover, the linkage of the excess portions of the surfaces 22 or 23 with the tape not only contributes nothing to the effectiveness of recording, but actually serves to weaken what has already been recorded. Additionally, it complicates the task of proper shielding to eliminate cross-talk. In order to obtain optimum results, therefore, the length L of the surface 22—23 should be no longer than $$\frac{\lambda_{f\ min.}}{2}$$

As previously mentioned, the exterior surface 90 of the diverging leg portion 60 forms an angle $\alpha$ with the presenting surface which, for the purpose of this discussion is considered to be identical with the lower surface of the magnetic tape 96. Similarly, the exterior surface 63 of the diverging leg portion 62 forms angle $\beta$ with the presenting surface. Due to the asymmetrical construction of the core, the angle $\alpha$ is smaller than the angle $\beta$ and is therefore critical. In general, it is desirable to make this angle as large as possible in order to preclude any linkage of the flux lines 98 with the leg portion 60. In practice, it is necessary to adopt the construction illustrated in the drawings in order to provide a sturdier core and to avoid too rapid a change in the direction of the flux flow in the core. In a preferred embodiment of this invention, the angle $\alpha$ was chosen to provide an attenuation of the output signal of six db per octave at frequencies below $f$ min.

From the foregoing explanation, it will be clear that the ratio of $$\frac{l_g}{L}$$

determines the frequency limits of the frequency band in which the data transfer is effected. In one embodiment of the invention where $l_g$ was equal to 0.5 mils and L was equal to 20 mils, the half power points were at 2 kc. and at 80 kc. respectively and the maximum amplitude occurred at 50 kc. Subject to the limitations outlined above, the ratio of $$\frac{l_g}{L}$$

may be as small as desired although a flat response will not be obtained where a single core is to operate over an excessively wide frequency band. The upper limit of the ratio $$\frac{l_g}{L}$$

is determined by operating parameters which are independent of those discussed herein. In the region where $$\frac{l_g}{L}$$

approaches $$\frac{1}{5}$$

these aforesaid parameters predominate and determine the frequency response of the magnetic core.

The present invention finds application in digital recording as well as in CW signals. For example, where pulse signals are to be recorded it is usually desirable to eliminate the lower frequencies in order to reduce the signal noise content. This can readily be carried out with the present invention, the rate of attenuation of the lower frequencies being determined by the angle $\alpha$.

Figure 5:
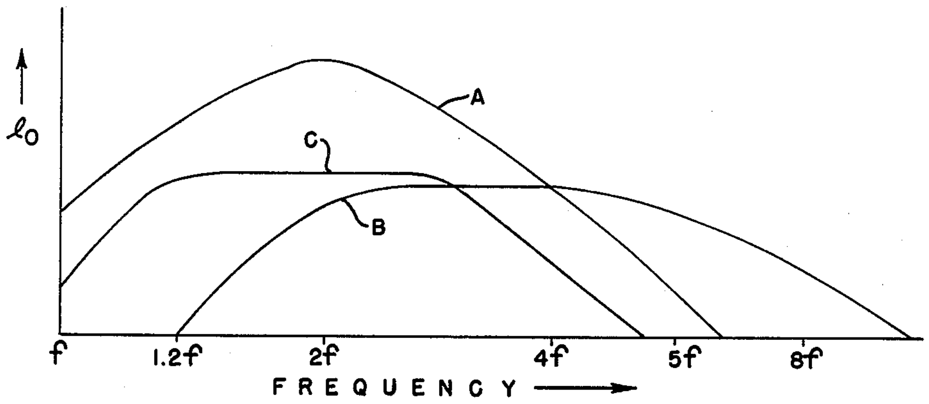
FIGURE 5 illustrates the frequency response of another embodiment of the invention.

At times it is desirable in digital data processing systems to record binary Zeros and binary Ones at different frequencies. Curve A of FIGURE 5 illustrates a response curve for a conventional magnetic core. If binary Ones and Zeros are recorded at frequencies of $2f$ and $4f$ respectively, the amplitude of the output signal $e_0$ at $4f$ is seen to be down approximately 20 db from that obtained at $2f$. An operation such as this is unsatisfactory since it may cause overloading and saturation at maximum signal amplitudes and the loss of data at minimum signal amplitudes.

If a lower signal level is acceptable, a considerable improvement in the relative strength of the signals at the frequencies $2f$ and $4f$ may be obtained by applying the principles of the invention set forth hereinabove. Specifically, the dimension L may be chosen to place the lower limit of the frequency band in the vicinity of $2f$, while the gap length $l_g$ is made sufficiently small to extend the high frequency band limit to the vicinity of the frequency $4f$. This operation is illustrated in FIGURE 5 by the curve B.

FIGURE 5 illustrates a further aspect of the apparatus described herein, whereby the principles of the invention may be employed to obtain a signal of relatively constant amplitude in a frequency band which is much broader than that obtainable with a single magnetic core. For example, the frequency range of the curve B in FIGURE 5 which extends from the frequency of $2f$ to a frequency of approximately $5f$ before excessive attenuation occurs, may be inadequate for a particular purpose where a lower frequency response is called for. By using a second magnetic core in the same head assembly, which has a frequency range represented by the curve C in FIGURE 5, a total band width is obtained which extends from approximately $1.2f$ to $5f$. The principle may, of course, be extended to include any desired number of magnetic cores with different frequency characteristics in a common head assembly. A further advantage of such a magnetic head assembly resides in the fact that it permits each core to be separately biased to obtain the optimum signal-to-noise ratio for its particular frequency range.

It will be apparent from the foregoing disclosure of the preferred embodiment of the invention, that numerous modifications, changes and equivalents will now occur to those skilled in the art, all of which fall within the true spirit and scope contemplated by the invention.

What is claimed is:

1. A magnetic head assembly for transferring data between a multi-track magnetic storage medium and said assembly in a range of frequencies defined by the wave lengths $\lambda_{f\ min.}$ to $\lambda_{f\ max.}$, where $\lambda_{f\ min.} \geqq 5\lambda_{f\ max.}$, said head assembly comprising a curved surface adapted to be presented to said storage medium, a plurality of substantially identical flat magnetic read-write cores positioned parallel to each other along the transverse dimension of said head assembly at intervals corresponding to the spacing of said tracks, each of said read-write cores being asymmetrically divided by a plane to form a pair of core sections of progressively decreasing cross-sectional area, each of said core sections including a base portion substantially normal to said plane, respective base portions abutting each other in said plane to form a continuous flux path, each of said core sections further including a core leg having first and second portions, said first leg portion being substantially normal to its base portion, said second leg portion being angularly disposed with respect to said first leg portion and converging toward said plane, the exterior surface of said second leg portion being terminated by said presenting surface and intersecting the latter at a predetermined angle, said angle being adapted to decrease the flux linkage between said core and said storage medium at a rate of at least 6 db per octave for frequencies below said $f$ min., a pole piece extending from said second leg portion toward said plane and having interior and exterior surfaces substantially parallel to said base, the length of said exterior surface being substantially equal to $$\frac{\lambda_{f\ min.}}{2}$$

a pole face substantially normal to the surfaces of said pole piece, the respective pole faces of both sections of each core confronting each other to define a gap centered about said plane and having a gap length substantially equal to $$\frac{\lambda_{f\ max.}}{2}$$

a spacer of non-magnetic material disposed in said gap, the exterior surfaces of said spacer and of said pole pieces conforming with said curved presenting surface, a non-magnetic metal surrounding said core and extending into the space defined by each of said predetermined angles, successive core gaps of said assembly being aligned along the transverse dimension of the latter, a non-magnetic shielding foil disposed between successive ones of said read-write cores and extending beyond the latter, one edge of each of said foils conforming to said presenting surface, a winding disposed on each of said cores adapted to be energized, a shielding foil disposed to one side of said read-write cores and transversely dividing said head assembly, an asymmetrical erasing core disposed on the other side of said transversely positioned shielding foil and having a cross-sectional configuration substantially identical to that of said read-write cores, said erasing core including an erasing gap having a transverse dimension substantially equal to the maximum transverse spacing of said read-write cores, a non-magnetic metal disposed in said erasing gap and surrounding said erasing core, and a winding disposed on said erasing core adapted to be energized.

2. The apparatus of claim 1 wherein said base portions, said first pair of leg portions and said pole pieces respectively of each of said cores each have substantially parallel sides to provide uniform cross-sectional areas of progressively decreasing size, said second pair of leg portions having tapered sides to provide a continuously decreasing cross-sectional area, each transition linking successive portions of said core sections having rounded corners and a decreasing cross-sectional area, said read-write cores and said erasing core respectively being positioned in mirror-image relation with respect to said transverse shielding foil to provide minimum spacing between the asymmetrcally disposed gaps thereof.

References Cited in the file of this patent

UNITED STATES PATENTS

| | | |
|---|---|---|
| 2,531,642 | Potter | Nov. 28, 1950 |
| 2,615,989 | Thad | Oct. 28, 1952 |
| 2,756,280 | Rettinger | July 24, 1956 |
| 2,848,555 | Camras | Aug. 19, 1958 |
| 2,905,933 | Canepa | Nov. 22, 1959 |
| 2,923,779 | Namenyi-Katz | Feb. 2, 1960 |

OTHER REFERENCES

RCA Technical Notes, RCA TN No. 214 (received Scientific Library Jan. 5, 1959).